UNITED STATES PATENT OFFICE 2,537,813

HYDROGENATION OF ALKYL FURANS TO PRODUCE KETONES

John George Mackay Bremner, David Gwyn Jones, and Robert Reid Coats, Norton-on-Tees, England, assignors to Imperial Chemical Industries Limited, a corporation of Great Britain No Drawing. Application March 20, 1947, Serial No. 736,110. In Great Britain March 29, 1946

1 Claim. (Cl. 260—593)

This invention relates to the hydrogenolysis of heterocyclic compounds, particularly of sylvan.

According to the invention there is provided a process for the continuous hydrogenolysis of 2-alkyl-substituted furans which comprises reacting them with hydrogen in the vapour phase at elevated temperature in the presence of a copper containing catalyst. Examples of suitable catalysts are copper-on-zinc oxide, copper-on-magnesia, copper-on-gamma-alumina, copper silicate, copper chromite and foraminate copper catalysts, such as foraminate copper-aluminum and foraminate copper-silicon. The catalysts may be alkalised, for example with sodium carbonate.

The process is of greatest value in relation to the hydrogenolysis of the lower 2-alkyl-substituted furans, for example methyl and ethyl furans. When sylvan is hydrogenated in this way methyl-n-propyl ketone is produced, the reaction being represented by the equation:

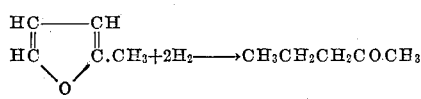

2-ethyl furan in a similar way yields ethyl-n-propyl ketone.

Pressures from atmospheric up to five atmospheres gauge may be employed. It is preferred not to use more than 5 atmospheres gauge since there is a tendency for over-hydrogenation to occur, resulting in the production of alcohols. Temperatures of 200°–400° C. are suitable, and temperatures of 300°–330° C. are preferred. When sylvan is hydrogenated at atmospheric pressure in the presence of a copper-on-zinc oxide catalyst it is preferred to employ a temperature of 300°–330° C. The temperature referred to is peak catalyst temperature, which is the maximum temperature recorded by a thermocouple disposed axially in the catalyst mass. Where, as usually, the catalyst is not working under isothermal conditions it is desirable that the average temperature beyond the reaction zone be kept below that at which over-hydrogenation to alcohol occurs. Liquid space velocities of up to 1 hour$^{-1}$ may be used, that is litres of liquid reactant per litre of bulk catalyst volume per hour, but it is preferred to employ a liquid space velocity of up to 0.5 hour$^{-1}$.

Preferably substantially pure, for example electrolytic hydrogen, is employed. At pressures near atmospheric it is preferred to employ a molar ratio of hydrogen of from 5:1 to 7:1 but at pressures approaching 5 atmospheres it is preferred to employ approximately the stoichiometric amount.

The method of preparing the various catalysts will now be described.

The foraminate copper catalysts may be prepared by forming an alloy of copper with a metal more soluble in acid or alkali than copper, obtaining this in particulate form, e. g. as ¼″–⅜″ granules and treating the particles with aqueous acid or alkali to remove part of the alloying metal and obtain a catalyst with a highly active surface. Examples of suitable copper alloys are those with aluminium and silicon, from both of which foraminate catalysts may be prepared by extraction with aqueous alkali. Foraminate copper-aluminium catalysts of the type described in co-pending British Application No. 13,493/46 prepared from alloys in which the Cu:Al ratio by weight is between 40:60 and 80:20, by treatment with aqueous alkali, or foraminate copper-silicon catalysts of the type described in copending British Application No. 29,371/46 from alloys in which the Cu:Si ratio by weight is between 50:50 and 92:8, by treatment with aqueous alkali, are preferred because they are very efficient and because they withstand oxidative and reductive regeneration satisfactorily. We have found that it is also possible to use foraminate copper-aluminium catalysts containing less than the aforesaid ratio, for example with as little as 34% of copper, but these are not so robust as the other, and do not stand up well to continuous and frequent regeneration.

Of the ether catalysts those which are supported are preferred. Among the suitable catalysts are copper-on-gamma-alumina, copper-on-zinc-oxide, copper silicate, copper chromite. A typical copper chromite catalyst has the atom ratio Cu:Cr:Mg 1:1.05:0.04 and may be prepared, for example by the method of Adkins, Connor and Folkers (J. A. C. S. 1932, 54, 1138). Copper-on-zinc oxide gives good results, and may be prepared, for example, by forming a solution of copper and zinc salts, for example nitrates or sulphates, and adding an aqueous solution, e. g. 5%, of sodium carbonate. The mixed precipitate is filtered off, washed, dried and calcined at 300° C. The product is ground and pelleted. The pellets are reduced in hydrogen diluted with nitrogen at 300° C. before use. Copper-on-gamma-alumina, also a very suitable catalyst, may be prepared, for example, by forming gamma-alumina by ignition of alumina mono- or tri- hydrate. The product is impregnated with copper nitrate solution in quantities sufficient to give 5-30%, in particular about 20%, copper in the finished catalyst, and is ignited at up to 400° C. to convert the copper salt to the oxide. The catalyst mass is then subjected to the action of diluted hydrogen at 300° C. before use to reduce the copper compound to metal. Other catalysts of this latter type can be prepared (1) by treating commercial activated alumina with copper nitrate to give a copper content of 20% and igniting and reducing as before: (2) by forming a co-precipitate containing copper and aluminium from a mixed solution of their salts by addition of sodium carbonate, filtering off the precipitate heating to 350° C. and pelleting. It is desirable that these catalysts should be pelleted, and also that they should be reduced with hydrogen before use, and preferably heated at not more than 350° C.

The invention is illustrated but not limited by the following examples.

*Example 1*

430 gms. of sylvan was passed at a liquid space velocity of 0.4 hour$^{-1}$ over copper-on-zinc oxide pellets during 5.8 hours together with electrolytic hydrogen which was passed at the rate of 137 litres per hour. The reactor comprised a tube packed with the catalyst. The average peak temperature of the catalyst was 325° C. The product weighed 399 gms. and on distillation gave 98 gms. of unchanged sylvan and 130 gms. of methyl propyl ketone, which latter was identified by distillation and by the preparation of the 2,4-dinitro-phenyl hydrazine.

*Example 2*

Ethyl furan was subjected to hydrogenolysis according to the process of Example 1 and ethyl n-propyl ketone was obtained.

We claim:

A process for the production of commercial yields of a lower alkyl-n-propyl ketone which comprises reacting a compound selected from the group consistsing of 2-methyl furan and 2-ethyl furan, in the absence of furfural, with hydrogen in the vapor phase at 300-330° C. wherein the molar ratio of hydrogen to the furan compound is from 5:1 to 7:1, in the presence of a copper-on-zinc oxide catalyst at a pressure of 1-5 atmospheres gauge and at a liquid space velocity of up to 0.5 hour$^{-1}$.

JOHN GEORGE MACKAY BREMNER.
DAVID GWYN JONES.
ROBERT REID COATS.

REFERENCES CITED

The following references are of record in the file of this patent:

UNITED STATES PATENTS

| Number | Name | Date |
|---|---|---|
| 1,739,919 | Ricard et al. | Dec. 17, 1929 |
| 2,077,409 | Graves | Apr. 20, 1937 |
| 2,167,203 | Guinot | July 25, 1939 |

OTHER REFERENCES

Padoa et al., "Atti della Reale Accadamia dei Lincei," (Rome), vol. 15, II (1906), pages 610-615.

Conner et al., J. Am. Chem. Soc., vol. 54, pages 4678-4690 (1932).

Burnette, "Iowa State Coll. J. Sci.," vol. 19, pages 9-10 (1944). Abstracted in Chemical Abstracts, vol. 39, 831-3 (1945).

Pringsheim et al., Berichte, vol. 53B, pages 114-118 (1920).

Douris, Compt. rend., vol. 157, pages 722-4 (1913).